(12) United States Patent
Labuda et al.

(10) Patent No.: US 10,705,114 B2
(45) Date of Patent: Jul. 7, 2020

(54) METROLOGICAL SCANNING PROBE MICROSCOPE

(71) Applicant: Oxford Instruments Asylum Research, Inc., Goleta, CA (US)

(72) Inventors: Aleksander Labuda, Goleta, CA (US); Deron Walters, Santa Barbara, CA (US); Jason Cleveland, Santa Barbara, CA (US); Roger Proksch, Santa Barbara, CA (US)

(73) Assignee: Oxford Instruments Asylum Research Inc

( * ) Notice: Subject to any disclaimer, the term of this patent is extended or adjusted under 35 U.S.C. 154(b) by 0 days.

(21) Appl. No.: 16/460,470

(22) Filed: Jul. 2, 2019

(65) Prior Publication Data

US 2019/0324054 A1 Oct. 24, 2019

Related U.S. Application Data

(63) Continuation of application No. 15/798,941, filed on Oct. 31, 2017, now Pat. No. 10,338,096, which is a continuation of application No. 14/931,625, filed on Nov. 3, 2015, now Pat. No. 9,804,193, which is a continuation-in-part of application No. 13/999,614, filed on Mar. 12, 2014, now Pat. No. 9,383,386.

(60) Provisional application No. 62/123,004, filed on Nov. 3, 2014.

(51) Int. Cl.
*G01Q 20/02* (2010.01)
(52) U.S. Cl.
CPC .................... *G01Q 20/02* (2013.01)
(58) Field of Classification Search
CPC .................................................. G01Q 20/02

USPC ................ 850/1, 5, 6, 21, 33, 40
See application file for complete search history.

(56) References Cited

U.S. PATENT DOCUMENTS

| | | |
|---|---|---|
| 4,724,318 A | 2/1988 | Bennig |
| 4,747,698 A | 5/1988 | Wickramasinghe et al. |
| 5,003,815 A | 4/1991 | Martin et al. |
| 5,047,633 A | 9/1991 | Finlan et al. |
| 5,144,150 A | 9/1992 | Yoshizumi et al. |
| 5,144,833 A | 9/1992 | Amer et al. |
| 5,412,980 A | 5/1995 | Elings et al. |
| 5,441,343 A | 8/1995 | Pylkki et al. |
| 5,512,745 A | 4/1996 | Finer et al. |
| 5,825,020 A | 10/1998 | Hansma et al. |
| 6,330,824 B1 | 12/2001 | Erie et al. |
| 6,696,370 B2 | 2/2004 | Jackson |
| 7,497,613 B2 | 3/2009 | King et al. |

(Continued)

FOREIGN PATENT DOCUMENTS

WO WO2014158290 A1 10/2014

OTHER PUBLICATIONS

Binnig G, Quate CF, Gerber C. Atomic force microscope. Phys. Rev. Lett. 1986; 56:930.

(Continued)

*Primary Examiner* — Nicole M Ippolito
*Assistant Examiner* — Hanway Chang
(74) *Attorney, Agent, or Firm* — Law Office of Scott C Harris, Inc

(57) ABSTRACT

This invention relates to a metrological scanning probe microscope system combining an SPM which employs an optical lever arrangement to measure displacement of the probe indirectly with another SPM which measures the displacement of the probe directly through the use of an interferometric detection scheme.

14 Claims, 10 Drawing Sheets

(56) References Cited

U.S. PATENT DOCUMENTS

| | | | |
|---|---|---|---|
| 8,370,960 | B2 | 2/2013 | Proksch et al. |
| 8,443,459 | B2 | 5/2013 | Phan et al. |
| 8,458,810 | B2 | 6/2013 | McConney |
| 2005/0247874 | A1 | 11/2005 | Ando et al. |
| 2007/0195333 | A1 | 8/2007 | Negishi |
| 2008/0198448 | A1 | 8/2008 | Ganser |
| 2008/0223117 | A1 | 9/2008 | Watanabe |
| 2009/0300806 | A1 | 12/2009 | Negishi |
| 2010/0257643 | A1 | 10/2010 | Reifenberger et al. |
| 2011/0251059 | A1 | 10/2011 | Zuilhof et al. |
| 2011/0252891 | A1 | 10/2011 | Cherman et al. |
| 2012/0096602 | A1 | 4/2012 | Martines et al. |
| 2013/0074920 | A1 | 3/2013 | Echegoyen et al. |

OTHER PUBLICATIONS

R. Garcia, Amplitude Modulation Atomic Force Microscopy (Wiley-VCH, Weinheim, 2010).
P. Gleyzes, R K. Kuo, and A. C. Boccara, "Bistable Behavior of a Vibrating Tip Near a Solid-Surface," Applied Physics Letters 58 (25), 2989-2991 (1991).
Q. Zhong, D. Inniss, K Kjoller, and V. B. Elings, Surf. Sci. Lett. 290, L688 (1993).
D.A. Chernoff, edited by Gm. Bailey et al. (Jones and Begell, New York, 1995), pp. 888-889.
P. Achalla, J. McCormick, T. Hodge et al., "Characterization of elastomeric blends by atomic force microscopy," Journal of Polymer Science: Part B 44, 492-503 (2005).
J.B. Pethica and W.C. Oliver, "Tip surface interactions in STM and AFM," Physica Scripta T19A, 61-66 (1987).
R. Garcia, J. Tamayo, and A. San Paulo, "Phase contrast and surface energy hysteresis in tapping mode scanning force microscopy," Surface and Interface Analysis 27 (5-6), 312-316 (1999).
Yagun Zhao, Qian Cheng, Menglu Qian et al., "Phase image contrast mechanism in intermittent contact atomic force microscopy," Journal of Applied Physics 108, 094311 (2010).
Wensheng Xu, Paula M. Wood-Adams, and Christopher G. Robertson, "Measuring local viscoelastic properties of complex materials with tapping mode atomic force microscopy," Polymer 47, 4798 (2006).
F. Dubourg, JP Aime, S Maursaudon et al., "Probing viscosity of a polymer melt at the nanometer scale with an oscillating nanotip," Eur Phys J E6, 49-55 (2001).
G.J.C. Braithwaite and P.F. Luckham, "The simultaneous determination of the forces and viscoelastic properties of adsorbed polymer layerse," Journal of Colloid and Interface Sciece 218, 917 (1999).
A. Noy, C.H. Sanders, D.V. Vezenov et al., "Chemically sensitive imaging in tapping mode by chemical force microscopy: Relationship bewteen phase lag and adhesion," Langmuir 14 (7), 1508-1511 (1998).
R. Garcia N. F. Martinez, "Measuring phase shifts and energy dissipation with amplitude modulation AFM," Nanotechnology 17, S167-172 (2006).
J.P. Cleveland, B. Anczykowski, A.E. Schmid et al., "Energy dissipation in tapping mode atomic force microscopy," Applied Physics Letters 72, 2613-2615 (1998).
Carlos J. Gomez and Ricardo Garcia, "Determination and simulation of nanoscale energy dissipation processes in ampltiude modulation AFM," Ultramicroscopy, 626-633 (2010).
A. San Paulo and R. Garcia, "Unifying theory of tapping-mode atomic-force microscopy," Physical Review B [Condensed Matter and Materials Physics] 66 (4), 041406/041401-041404 (2002).
Noncontact Atomic Force Microscopy, edited by S. Morita, R. Wiesendanger, and E. Meyer, Springer, Berlin, (2002).
F. J. Giessibl, Rev. Mod. Phys. 75, 949 (2003).
R. García and R. Pérez, Surf. Sci. Rep. 47, 197 (2002).
Y. Sugimoto, M. Abe, S. Hirayama, N. Oyabu, O. Custance, and S. Morita, Nat. Mater. 4, 156 (2005).
M. A. Lantz, H. J. Hug, R. Hoffman, P. J. A. van Schendel, P. Kappenberger, S. Martin, A. Baratoff, and Fl J. Guntherodt, Science 291,2580 (2001).
N. Oyabu, P. Pou, Y. Sugimoto, P. Jelinek, M. Abe, S. Morita, R. Perez, and O. Custance, Phys. Rev. Lett. 96, 106101 (2006).
Y. Sugimoto, P. Pou, O. Custance, P. Jelinek, S. Morita, R. Perez, and M. Abe, Phys. Rev. B 73, 205329 (2005).
Y. Sugimoto, P. Jelinek, P. Pou, M. Abe, S. Morita, R. Perez, and O.Custance, Phys. Rev. Lett. 98, 106104 (2007).
Y. Sugimoto, P. Pou, M. Abe, P. Jelinek, R. Perez, S. Morita, and O. Custance, Nature(London) 446, 64 (2007).
J. I. Kilpatrick, A. Gannepalli, J. P. Cleveland and S. P. Jarvis, Rev. Sci. Inst., 80, 023701 (2009).
A. Gannepalli, A. Sebastian, J. Cleveland, and M. Salapaka, Appl. Phys. Lett. 87, 111901 (2005).
R. Proksch and E.D. Dahlberg, Rev. Sci. Instr. 64, 912 (1993).
M. Stark, R. Guckenberger, A. Stemmer, and R.W. Stark, J. Appl. Phys. 98, 114904 (2005).
R. Proksch, Appl. Phys. Lett. 89, 113121 (2006).
B.J. Rodriguez, C. Callahan, S.V. Kalinin, and R. Proksch, Nanotechnology 18, 475504 (2007).
M. Baumann and R.W. Stark, Ultramicroscopy 110, 578-581 (2010).
G. Chawla and S. D Solares, Meas. Sci. Technol. 20, 015501 (2009).
M. Stark, R.W. Stark, W.M. Heckl, and R. Guckenberger, Proc. Natl. Acad. Sci. USA 99, 8473-8478 (2002).
T.R. Rodriguez and R. Garcia, Appl. Phys. Lett. 84, 449 (2004).
J.W. Li, J.P. Cleveland, and R. Proksch, Appl. Phys. Lett. 94, 163118 (2009).
J.R. Lozano and R. Garcia, Phys. Rev. Lett. 100, 076102 (2008).
R.W. Stark, Appl. Phys. Lett. 94, 063109 (2009).
D. Platz, E. A. Tholén, D. Pesen, and D. B. Haviland, Appl. Phys. Lett. 92, 153106 (2008).
A.B. Kos and D.C. Hurley, Meas. Sci. Technol. 19, 015504 (2008).
R. Nath, Y.H. Chu, N.A. Polomoff, R. Ramesh, and B.D. Huey, Appl. Phys. Lett 93, 072905 (2008).
S. Jesse, S.V. Kalinin, R. Proksch, A.P. Baddoif, and B.J. Rodriguez, Nanotechnology 18, 435503 (2007).
S. Jesse and S.V. Kalinin, Nanotechnology 20, 085714 (2009).
S. Jesse, B. Mirman, and S.V. Kalinin, Appl. Phys. Lett. 89, 022906 (2006).
R. Proksch and D. Yablon, Appl. Phys. Lett., 100, 073106 (2012).
M. Stark, R. W. Stark, W. M. Heckl, and R. Guckenberger, Proc. Natl. Acad. Sci. USA 99, 8473 (2002).
N. F. Martinez, S. Patil, J. R. Lozano, and R. Garcia, Appl. Phys. Lett. 89, 153 115 (2006).
O. Sahin, S. Magonov, C. Su, C. F. Quate, and O. Solgaard, Nature Nanotech. 2, 507 (2007).
R. Proksch, D. Yablon, and A. Tsou, ACS Rubber Division 180th Technical Meeting, 2011-24 (2011).
S. D. Solares and G. Chawla, J. Appl. Phys., 108, 054901 (2010).
S. Guo, S. D. Solares, V. Mochalin et al., Small 8, 1264 (2012).
F. J. Giessibl, Phys. Rev. B 56(24) 16010 (1997).
D. A. Walters, J. P. Cleveland, N. H. Thomson et al. Rev. Sci. Inst., 67 3583 (1996).
K. Yamanaka, H. Ogiso, and O. Kolosov, Appl. Phys. Lett. 64, 178 (1994).
J. Rabe and W. Arnold, Appl. Phys. Lett. 64, 1493 (1994).
K. Yamanaka et al., Appl. Phys. Lett. 78, 1939 (2001).
U. Rabe et al., J. Phys. D: Appl. Phys. 35, 2621 (2002).
A. Gannepalli et al., Nanotechnology 22, 355705 (2011).
M P Nikiforov, S Hohlbauch,W P King, K Voitchovsky, S Contera, S Jesse, S V Kalinin and R Proksch, Nanotechnology, 22 (2011) 055709.
J. Lee et al. Journal of Microelectromechanical Systems, 15, 1644-1655, 2006.
Nelson, B. A. and W. P. King, Review of Scientific Instruments, 78, 023702, 2007.
P Yuya, D Hurley, J Turner J Appl Phys (2008) and (2011).
J Killgore et al. Langmuir (2011).
R. Proksch, S. Kalinin, Nanotechnology 21 455705 (2010).
K. Kobayashi, H. Yamada, and K. Matsushige, Review of Scientific Instruments 82, 033702 (2011).

(56) References Cited

OTHER PUBLICATIONS

A. Labuda, K. Kobayashi, D. Kiracofe, K Suzuki, P. Grutter, and H. Yamada, AIP Advances 1, 022136 (2011).
A. Labuda, K. Kobayashi, K. Suzuki, H. Yamada, and P. Grütter, Phys. Rev. Lett. 110, 066102 (2013).
A. Labuda, K. Kobayashi, Y. Miyahara, P. Grafter, Rev. Sci. Instrum. 83, 053702 (2012).
A. Labuda, P. Grafter, Langmuir 28, 5319 (2012).
Y. Martin, C.C. Williams, and H. K. Wickramasinghe, J. Appl. Phys. 61 (10), 4723 (1987).

Three Scenarios of Laser Spot Locations

METROLOGICAL SCANNING PROBE MICROSCOPE

This application claims priority from provisional No. 62/123,004, filed Nov. 3, 2015, the entire contents of which are herewith incorporated by reference.

This is a continuation in part of Ser. No. 13/999,614, filed Mar. 12, 2014, the entire contents of which are herewith incorporated by reference.

BACKGROUND OF THE INVENTION

Scanning probe devices such as the scanning Probe microscope ("SPM") or atomic force microscope ("AFM") can be used to obtain an image or other information indicative of the features of a wide range of materials with molecular and even atomic level resolution. In addition, AFMs and SPMs are capable of measuring forces accurately at the piconewton to micronewton range, in a measurement mode known as a force-distance curve or force curve. As the demand for resolution has increased, requiring the measurement of decreasingly smaller forces free of noise artifacts, the old generations of these devices are made obsolete. A demand for faster results, requiring decreasingly smaller cantilevers, only reinforces this obsolescence. The preferable approach is a new device that addresses the central issue of measuring small forces with minimal noise, while providing an array of modules optimizing the performance of the device when using small cantilevers or when doing specialized applications such as optical techniques for biology, optical techniques for photochemical, photothermal, photovoltaic and other light induced changes to the cantilever or sample, nanoindentation and electrochemistry.

For the sake of convenience, the current description focuses on systems and techniques that may be realized in particular embodiments of scanning probe devices, the SPM or the AFM. Scanning probe devices also include such instruments as 3D molecular force probe instruments, scanning tunneling microscopes ("STMs"), high-resolution profilometers (including mechanical stylus profilometers), surface modification instruments, nanoindenters, chemical/biological sensing probes, instruments for electrical measurements and micro-actuated devices. The systems and techniques described herein may be realized in such other scanning probe devices.

A SPM or AFM is a device which obtains topographical information (and other sample characteristics) while scanning (e.g., rastering) a sharp tip on the end of a probe relative to the surface of the sample. The information and characteristics are obtained by detecting small changes in the deflection or oscillation of the probe (e.g., by detecting changes in amplitude, deflection, phase, frequency, etc.) and using feedback to return the system to a reference state. By scanning the tip relative to the sample, a map of the sample topography or other characteristics may be obtained.

Changes in the deflection or oscillation of the probe are typically detected by an optical lever arrangement whereby an incident light beam is directed onto the side of the probe opposite the tip and a reflected beam from the probe illuminates a position sensitive detector ("PSD"). As the deflection or oscillation of the probe changes, the position of the reflected spot on the PSD also changes, causing a change in the output from the PSD. Changes in the deflection or oscillation of the probe are typically made to trigger a change in the vertical position of the base of the probe relative to the sample (referred to herein as a change in the Z position, where Z is generally orthogonal to the X/Y plane defined by the sample), in order to maintain the deflection or oscillation at a constant pre-set value. It is this feedback that is typically used to generate a SPM or AFM image.

It will be noted that the optical lever arrangement measures probe motion indirectly by measuring the angle of reflection of a light beam from the probe to the PSD. A few SPMs and AFMs, particularly earlier manifestations, have measured the motion of the probe directly through the use of an interferometric detection scheme. This method of measuring the motion of the probe gives the user a direct measurement of probe displacement and velocity.

SPMs or AFMs can be operated in a number of different sample characterization modes, including contact modes where the tip of the probe is in constant contact with the sample surface, and AC modes where the tip makes no contact or only intermittent contact with the surface.

Actuators are commonly used in SPMs and AFMs, for example to raster the probe or to change the position of the base of the probe relative to the sample surface. The purpose of actuators is to provide relative movement between different parts of the SPM or AFM: for example, between the tip of the probe and the sample. For different purposes and different results, it may be useful to actuate the sample or the tip or some combination of both. Sensors are also commonly used in SPMs and AFMs. They are used to detect movement, position, or other attributes of various components of the SPM or AFM, including movement created by actuators.

For the purposes of this specification, unless otherwise indicated, the term "actuator" refers to a broad array of devices that convert input signals into physical motion, including piezo activated flexures; piezo tubes; piezo stacks, blocks, bimorphs and unimorphs; linear motors; electrostrictive actuators; electrostatic motors; capacitive motors; voice coil actuators; and magnetostrictive actuators; and the term "sensor" or "position sensor" refers to a device that converts a physical quantity such as displacement, velocity or acceleration into one or more signals such as an electrical signal, including optical deflection detectors (including those referred to above as a PSD and those described in U.S. Pat. No. 6,612,160, Apparatus and Method for Isolating and Measuring Movement in Metrology Apparatus); capacitive sensors; inductive sensors (including eddy current sensors); differential transformers (such as those described in U.S. Pat. No. 7,038,443 and continuations thereof, Linear Variable Differential Transformers for High Precision Position Measurements; U.S. Pat. No. 8,269,485 and continuations thereof, Linear Variable Differential Transformer with Digital Electronics; and U.S. Pat. No. 8,502,525, and continuations thereof, Integrated Micro-Actuator and Linear Variable Differential Transformers for High Precision Position Measurements, each of which is hereby incorporated by reference in their entirety); variable reluctance; optical interferometry; strain gages; piezo sensors; and magnetostrictive and electrostrictive sensors.

Some current SPM/AFMs can take images up to 100 um$^2$, but are typically used in the 1-10 um$^2$ regime. Such images typically require from four to ten minutes to acquire. Efforts are currently being made to move toward what has been called "video rate" imaging. Typically those who use this term include producing images at the rate of one per second all the way to a true video rate at the rate of 30 per second. Video rate imaging would enable imaging moving samples, imaging ephemeral events and simply completing imaging on a timelier basis. One important means for moving toward video rate imaging is to decrease the mass of the probe, thereby achieving a higher resonant frequency while maintaining a lower spring constant.

DESCRIPTION OF THE PREFERRED EMBODIMENTS

As already discussed the focused light beam in AFMs is used to measure the deflection or oscillation of the probe. It is desirable however to focus more than one light beam onto the probe to enable functionalities beyond measuring probe displacement. It is also desirable to focus more than one light beam onto the sample to enable other functionalities. The present invention resolves the design complications that stem from so focusing multiple light beams onto a single cantilever or the sample by overlapping the multiple light beams along a single optical axis of a single objective lens that is used to focus all the light beams congruently. The angular orientation or direction of travel of each light beam and the axial position of the focus of each light beam relative to the optical axis are controlled independently between light beams to allow for independent control of the three dimensional position of the focus location of each light beam relative to the cantilever or sample.

Figure 1:
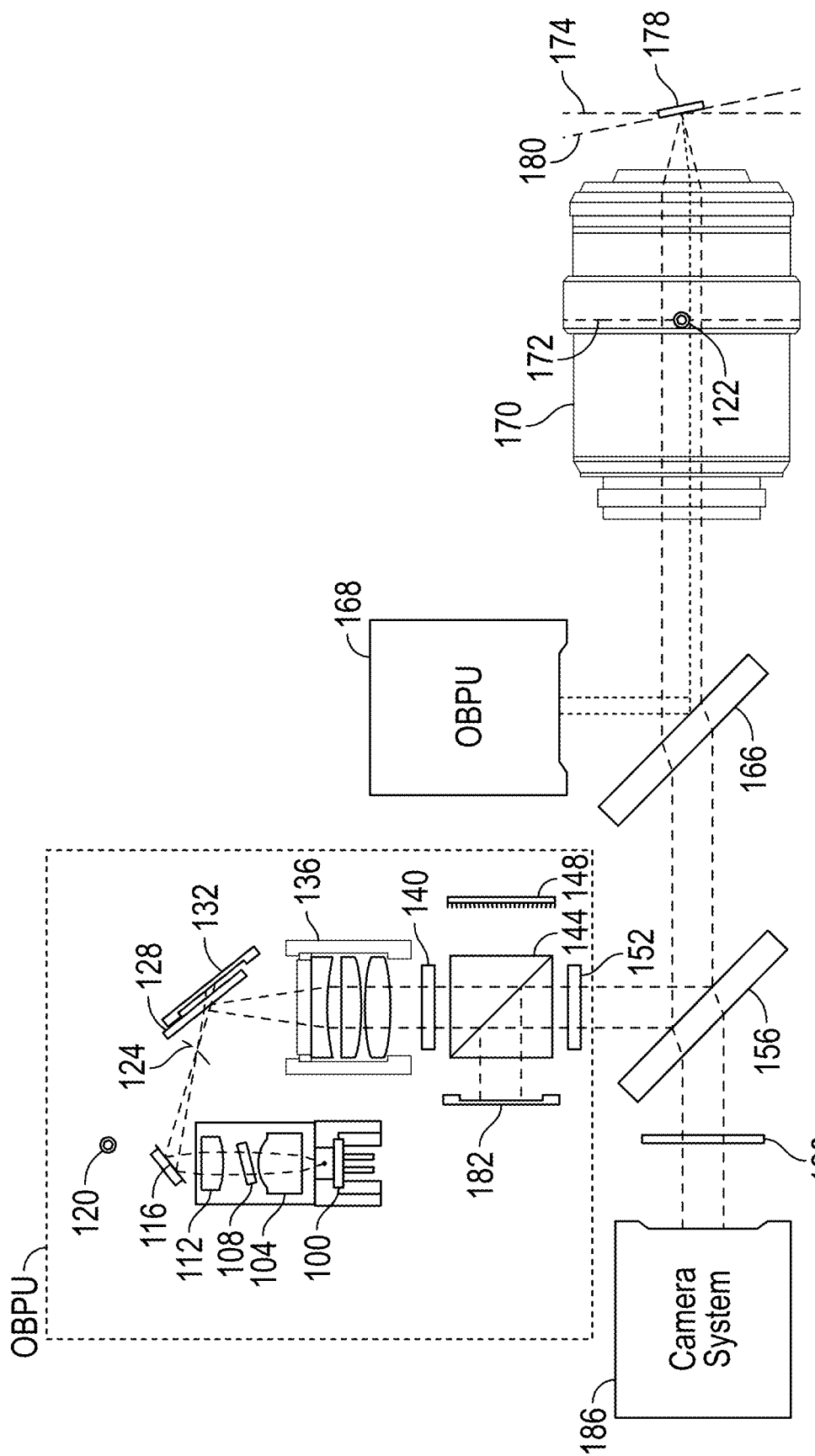
FIG. 1: A schematic of an optical beam positioning unit of the present invention optics used to form a focused light beam on the probe or the sample.

FIG. 1 shows a schematic of the optical beam positioning (OBPU) unit of the present invention which forms one focused light beam on the probe or the sample. Other focused light beams would employ a similar optical beam positioning unit. In FIG. 1 the light source 100 for the optics emits a divergent beam of light that is substantially collimated by a lens 104. The light source 100 could be a laser diode or another light source such as a superluminescent diode or light-emitting diode. The only requirement is that the power density be high enough to excite the desired effect in the cantilever or the sample. The lens 104 is preferably aspheric, in order to maximize the quality of the transmitted light beam.

The collimated (or nearly collimated) light beam exiting the lens 104 may optionally traverse a linear polarizer 108. The linear polarizer 108 can be rotated about the optical axis relative to the light source 100 (or the light source 100 may be rotated relative to the linear polarizer 108) in order to maximize the light power throughput or to tune a desired amount of light throughput if the maximum amount of light power is deemed excessive. Also, tilting the linear polarizer 108 relative to the optical axis may be advantageous as it can reduce the amount of back-reflected light returning into the light source 100. Back-reflected light may cause instabilities in the light emitting process.

The polarized light beam is subsequently passed through a lens 112 and refocused. This lens may be an aspheric lens, achromatic doublet, or other lens or lens group. The light beam then reflects from a steering mirror 116 that is disposed between the lens 112 and the focus of the light beam 124. The steering mirror 116 is supported so that it can be rotated about a physical pivot 120, defined as a point in three-dimensional space. As will be shown below, rotation of the steering mirror 116 about the physical pivot 120 provides a means for moving a focused spot in two dimensions in the plane of the probe or the plane of the sample. For the purposes of this specification these two planes are not shown separately in FIG. 1 but are collectively referred to herein as the target object 178.

Figure 4:
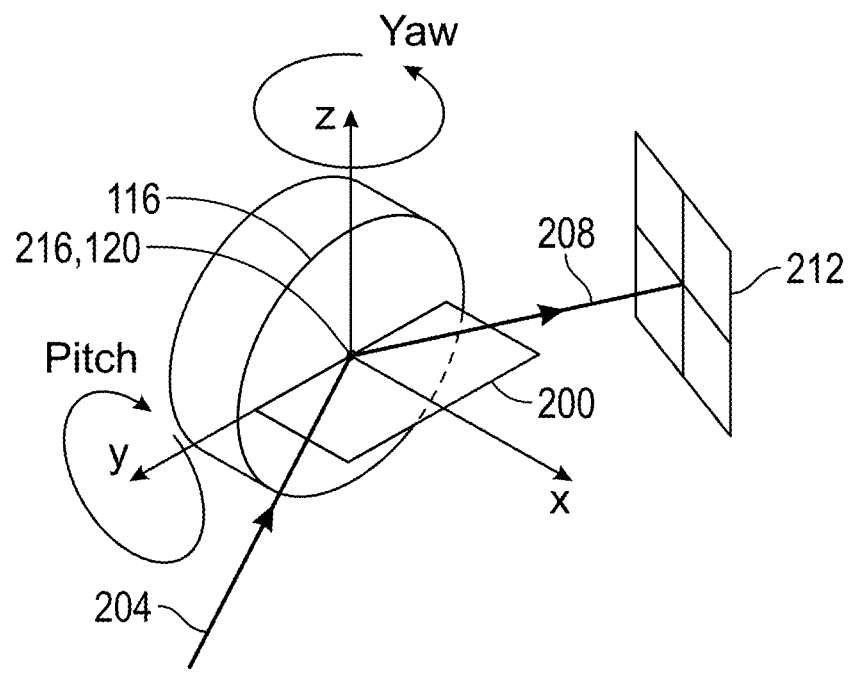
FIG. 4: Block diagram showing the Steering Mirror of an optical beam positioning unit and the Scheimpflug plane.

The functioning of the steering mirror 116 is illustrated in detail in FIG. 4. In the preferred embodiment of the present invention, the steering mirror 116 can be rotated about three orthogonal axes, two of which are parallel to the mirror 116 surface and are important for the purposes of the invention. The y-axis is one of the axes which is parallel to the mirror 116 surface. The y-axis lies within the plane 200 defined by the incident light beam 204 and the reflected light beam 208. The z-axis is the other axis which is parallel to the mirror 116 surface. The z-axis is orthogonal to the plane of incidence 200. Rotating the steering mirror 116 about the y-axis ("pitching" the steering mirror 116) or about the z-axis ("yawing" the steering mirror 116), or both, changes the direction and focus position of the reflected light beam 208. Rotating the steering mirror 116 about the x-axis ("rolling" the steering mirror 116) however has no effect on the direction of the reflected light beam 208.

In the preferred embodiment, the steering mirror 116 is provided with means for actuating the pitch and yaw rotations in order to produce the desired changes in the direction and focus of the reflected light beam 208. This means may preferably be a kinematic stage driven by transducers. The transducers and kinematic stage rotate the steering mirror 116 in two dimensions about the physical pivot 120. These transducers are preferably fine-pitch leadscrews driven by high-precision stepper motors. Alternately, the means of actuating the pitch and yaw rotations may be a rotary stage, flexure stage, or gimbal stage, and the transducers may be electromechanical motors, DC motors, piezoelectric inertial motors, piezoelectric transducers, or manual positioners. Preferably, if the transducers are stepper motors, they are provided with a gearbox to reduce the mechanical step size such that the positioning of the light beam focus is precise.

Figure 5:
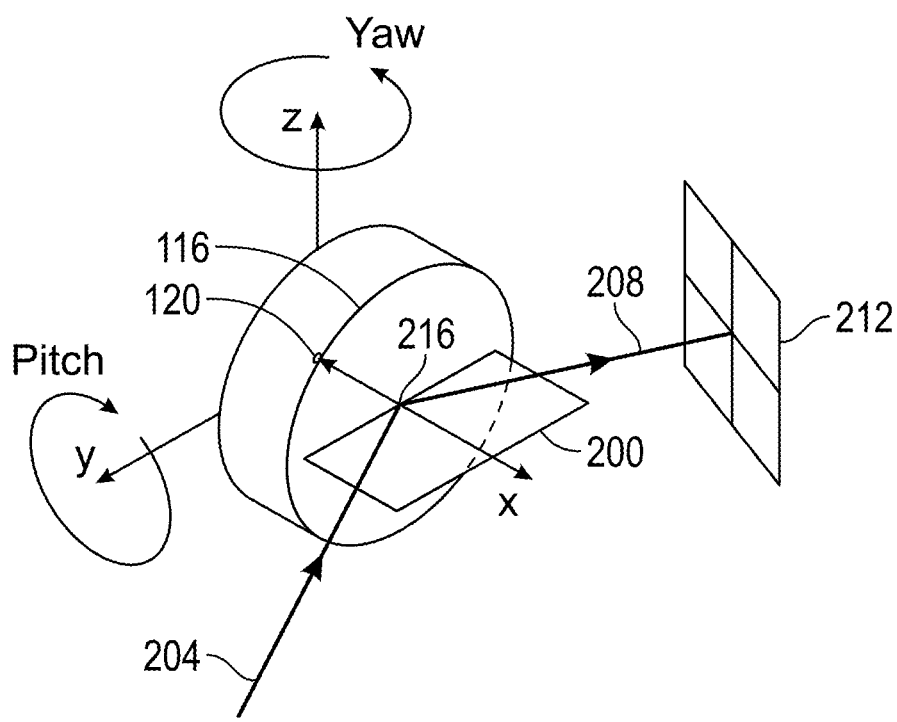
FIG. 5: Block diagram showing the Steering Mirror of an optical beam positioning unit and the Scheimpflug plane with the physical pivot translated along the x-axis.
Figure 6:
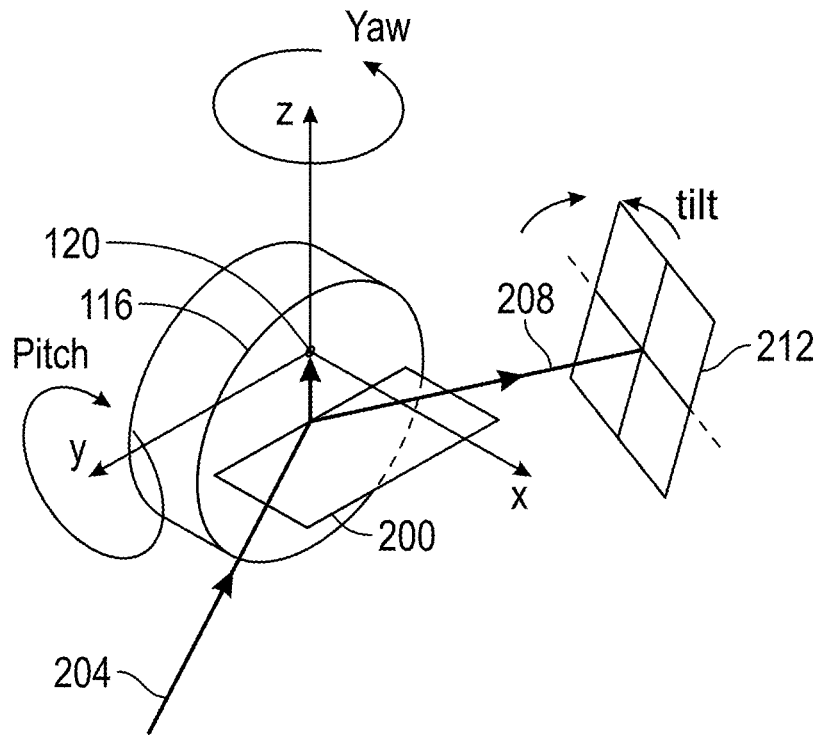
FIG. 6: Block diagram showing the Steering Mirror of an optical beam positioning unit and the Scheimpflug plane with the physical pivot translated along the z-axis.
Figure 7:
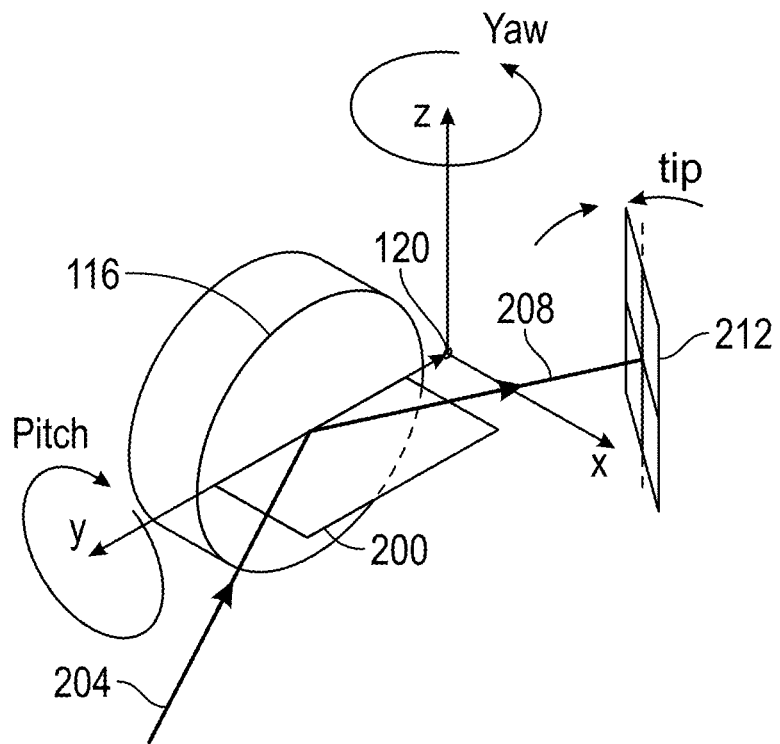
FIG. 7: Block diagram showing the Steering Mirror of an optical beam positioning unit and the Scheimpflug plane with the physical pivot translated along the y-axis.
Figure 8:
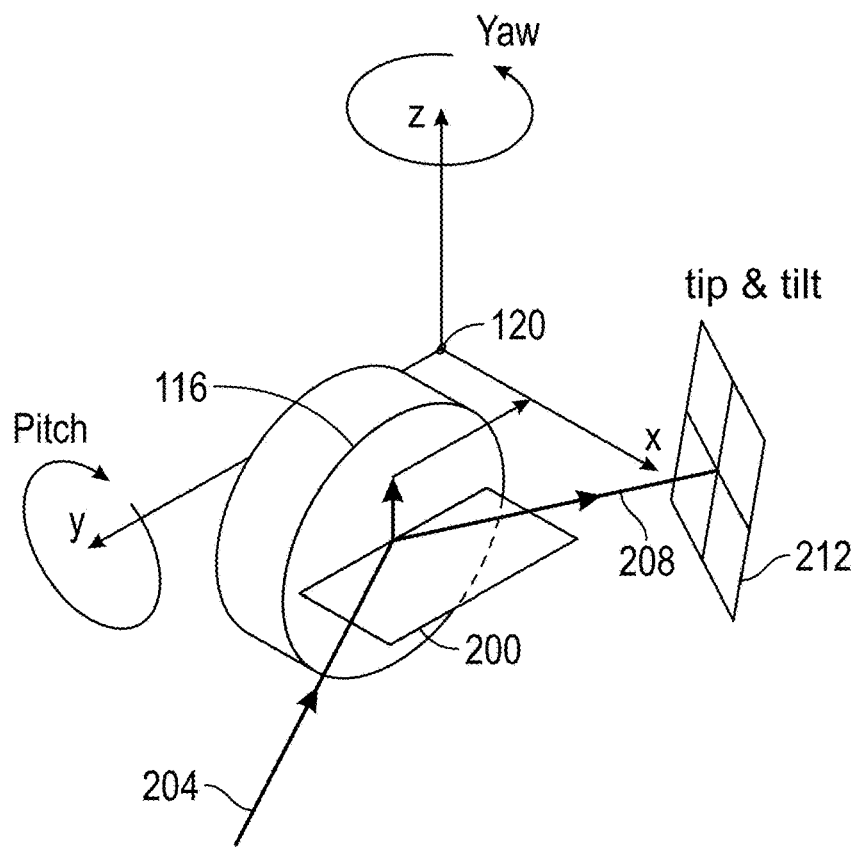
FIG. 8: Block diagram showing the Steering Mirror of an optical beam positioning unit and the Scheimpflug plane with the physical pivot translated along the y-axis, z-axis and x-axis.

Pitching and/or yawing the steering mirror 116 affects the reflected light beam 208 in two different ways. First, pitching and/or yawing the steering mirror 116 affects the two-dimensional angular orientation or direction of travel of the reflected light beam 208. Second, pitching and/or yawing the steering mirror 116 affects the axial position of the focus of the reflected light beam 208. If the physical pivot 120 (about which the steering mirror 116 can be rotated) is located at the point of incidence 216 (where the incident light beam 204 intersects the reflected light beam 208), as drawn in FIG. 4, the effect of pitching/yawing on the axial position of the focus is minimal. Only the angular orientation of the reflected light beam 208 is affected by pitching and/or yawing under this condition. However, if the physical pivot 120 is translated relative to the point of incidence 216 as shown in FIG. 5, FIG. 6 and FIG. 7, pitching and/or yawing moves the axial position of the focus of the reflected light beam 208 at the same time that it changes the angular orientation of the reflected light beam 208. This is crucial to the present invention. When designing the optical system, the exact location of the physical pivot 120 in three-dimensional space is tuned to set a desired relationship between the axial position of the focus and the angular orientation of the reflected light beam 208. When this relationship is achieved, the axial position of the focus is geometrically constrained to move along a mathematically defined surface, the "Scheimpflug surface" 124. For small angular changes around the reflected light beam 208 the Scheimpflug surface can be approximated by a "Scheimpflug plane" 212, as drawn in FIG. 4. The term Scheimpflug surface 124 refers to an optical principle, the Scheimpflug criterion, which is used to select the desired Scheimpflug plane 124 based on the planes of the target object 178.

As displayed in FIG. 4, translating the physical pivot 120 relative to the point of incidence 216 along the x-axis has no consequence on the orientation of the Scheimpflug plane. With the physical pivot 120 translated only along the x-axis, pitching and/or yawing the steering mirror 116 moves the reflected light beam 208 along the same Scheimpflug plane as it would have moved prior to translation of the physical pivot 120. Therefore, to understand the operation of the present invention, it suffices to discuss the effect of rotating the steering mirror 116 about rotation axes that are in the plane of the mirror surface, intersecting in a physical pivot 120 that is also in the plane of the mirror surface. It may be noted however that placing the physical pivot 120 along the x-axis a short distance behind the plane of the steering mirror 116 has little effect on performance.

FIG. 5 illustrates the effect of translating the physical pivot 120 along the z-axis: the Scheimpflug plane 212 is rotated due to simultaneous changes in the axial position of focus and angular orientation of the reflected light beam 208. Specifically, the Scheimpflug plane 212 is rotated ("tilted") along an axis that lies parallel to the plane of incidence 200. The position of the focus moves along a tilted focal plane as the steering mirror 116 is yawed or pitched about the physical pivot 120.

FIG. 6 illustrates the effect of translating the physical pivot 120 along the y-axis: the Scheimpflug plane 212 is rotated ("tipped") along an axis that lies perpendicular to the plane of incidence 200. Now, the position of the focus moves along a tipped focal plane as the steering mirror 116 is yawed or pitched about the physical pivot 120.

FIG. 7 illustrates that translations along the z-axis, the y-axis and the x-axis may be combined, with the Scheimpflug plane 212 both "tilted" along an axis that lies parallel to the plane of incidence 200 and "tipped" along an axis that lies perpendicular to the plane of incidence 200.

The Scheimpflug surface 124 has an optical image near the front focal plane 174 of the objective lens 170, which is approximated by the "conjugate Scheimpflug focal plane" 180 as shown in FIG. 1. The tilt angle of the conjugate Scheimpflug focal plane 180 about the optical axis of the reflected beam 208 [FIGS. 4, 5, 6, 7] is preferably tuned to match the tilt angle of the target object 178. Typically, AFM cantilevers are tilted by an angle between 5 and 15 degrees. It is preferred to position the physical pivot 120 location so as to induce a tilt in the conjugate Scheimpflug focal plane 180 that substantially matches the tilt angle of the cantilever. This allows the movement of the focused beam position along the cantilever by pitching or yawing the steering mirror 116 without the need to refocus the light beam, which would otherwise be required for the tilted cantilever.

In an alternative embodiment of this invention, translation of the goniometric lens group 136 may be used to compensate for the tilt angle of the cantilever. However, such an embodiment requires the use of three, instead of only two, motion transducers in order to retain a focused light spot on a tilted cantilever.

As depicted in FIG. 1, the light beam reflected from the steering mirror 116 converges to a focus at the Scheimpflug surface 124 and subsequently diverges beyond that surface. The diverging light beam is then redirected by reflection off a fold beamsplitter 128. The fold beamsplitter 128 reflects part of the light beam, while allowing another part to traverse through the fold beamsplitter 128 to a photodetector 132 which measures the total amount of optical power in the light beam. The photodetector 132 can thus be used to tune the desired amount of light power by changing the drive current of the laser diode 100 accordingly or, as previously discussed, by rotating the linear polarizer 108 accordingly. Typically, a small fraction of the light beam will be allowed to traverse through the fold beamsplitter 128 to the photodetector 132 and substantially all the light will be reflected from the fold beamsplitter 128. This division of the light beam is preferable as it maintains a high optical power density at the target object 178.

The photodetector 132 discussed in the previous paragraph may be a linear position-sensitive detector, in which case the position of light beam on the photodetector 132 can be used to determine the axial position of the focus and the angular orientation of the light beam. A calibration procedure may also suffice to determine these two geometric factors. However a linear position-sensitive detector is desirable because it obviates the need for closed-loop position control on the actuators that produce pitch and yaw in the steering mirror 116. However if closed-loop position control is in any event provided, a linear position-sensitive detector complements such control and provides a reinforcing measure of the nominal position or center position of the steering mirror 116.

In the absence of a photodetector 132, which is optional and not required for the functioning of the present invention, the fold beamsplitter 128 only acts as a mirror redirecting the light. With a different orientation and position of the optical components, the fold beamsplitter 128 may not be necessary.

After reflecting from the fold beamsplitter 128, the light beam traverses one or a number of lenses that substantially collimate the beam. This group of lenses 136 is referred to herein as the goniometric lens group. The number and kind of lenses used to collimate the light beam depends on the exact optical parameters of the particular optical beam positioning unit under consideration as known to those skilled in the art. In the present invention the goniometric lens group 136 is provided with a means for translating the group along the optical axis to change the degree of collimation of the outgoing light beam. Moving the group backward or forward causes the light beam to be more divergent or convergent after traversing the group. This allows a user to adjust the axial position of the final focused spot relative to the target object 178.

One possible means of translating the goniometric lens group 136 is by mounting the lens group in a threaded housing that is then rotated in a threaded bore. The mechanical motion of the lens group may be automated via a transducer, such as a motor, or manually adjusted by the user. The number of lenses in the group that may be required to move depends on the desired amount of collimation. The remainder of the lenses in the group, if any, may remain fixed.

The substantially collimated beam exiting the goniometric lens group 136 can be attenuated, if necessary, by the use of a filter 140 that attenuates the light by a prescribed amount. The filter 140 may be a neutral density filter, a rotationally variable neutral density filter, a colored filter, or a linear polarizing filter. In any case, the filter 140 can be adjusted manually by the user or through an automated mechanism to change the desired amount of light attenuation. Preferable automated mechanisms for this purpose include a rotationally variable neutral density filter on a motorized rotation stage and a motorized filter wheel with a plurality of filters, one of which is disposed in the beam. If filter 140 is a linear polarizing filter, either the filter or the polarizer can be rotated either manually or by some motorized mechanism. In any case it is preferable to electronically identify which, if any, filter 140 is disposed in the light beam so that the resulting beam power may be readily available.

The light beam emerging from the filter 140 then traverses a polarizing beamsplitter 144 which passes only one polarization direction of the beam. The portion of the beam that is polarized in the orthogonal direction to the desired polarization direction is reflected, rather than transmitted, and then absorbed by a beam dump 148, such as a black felt surface. The portion of the beam that is polarized in the desired polarization direction is transmitted to a quarter-wave plate 152 which converts the linearly polarized light beam transmitted into a circularly polarized light beam.

Optical elements in the path of the light beam after it exits the quarter-wave plate 152, such as the dichroic mirror 156, may introduce significant phase shifts between s-polarized and p-polarized light in the circularly polarized light beam. In this situation, the desired operation of the polarizing beamsplitter 144 and quarter wave plate 152 can be achieved by replacing the quarter wave plate 152 with a waveplate having sufficient retardance (greater or less than 0.25 waves) with suitable orientation so as to cancel the cumulative phase shift introduced by all subsequent optical elements in the light beam.

As noted above, the present invention may be used to measure the deflection or oscillation of the probe as is common with AFMs and may also be employed to focus more than one light beam onto the probe (or the sample) to enable functionalities other than measuring probe displacement. When the present invention is used to achieve these other functionalities, detection of the reflected beam from the probe or sample is not required. In this case, polarizing beamsplitter 144, waveplate 152 and beam stop 148, may be omitted without substantially changing the other aspects of the invention, and of course so also may the photodetector 182 used to measure the deflection or oscillation of the probe. In this connection it is necessary to remember that the presence or absence of the polarizing beamsplitter 144 and waveplate 152 have an important effect on the calculation of the correct distances in locating the virtual pivot 122 in the back focal plane 172 of objective lens 170.

Substantially all the circularly polarized light beam transmitted from the quarter-wave plate 152 is reflected from a dichroic mirror 156. Any portion of the beam that may traverse the dichroic mirror 156 is absorbed by a beam dump 160. A dichroic mirror is used here rather than a conventional mirror so that wavelengths other than the wavelengths in light source 100 will traverse the mirror 156 rather than being reflected, thereby allowing the camera system 186 to image light reflected from the target object 178.

The substantially collimated light beam exiting the dichroic mirror 156 then traverses another dichroic mirror 166, which allows for a light beam from another optical beam positioning unit to be combined into the light path, as will be described in more detail shortly. The collimated light beam then passes through an objective lens 170 that focuses the light beam close to the front focal plane 174 of the objective lens 170. The target object 178 targeted by the focused light beam is located close to the front focal plane 174 of the objective lens 170. The objective lens 170 may be a commercially available unit, such as the Olympus LUC Plan Fluor N 20x having a numerical aperture of 0.45, or it may be an objective lens designed specifically for use in this context. Typically, an objective lens for use in this context is composed of several optical components, some of which may be translated with respect to others to adjust the position of the front focal plane relative to the position of the lens, or to adjust the spherical aberration correction of the focused spot. The preferred lens will have apochromatic or semi-apochromatic ("Fluor") correction of chromatic aberrations because it may be anticipated that multiple light beams of different wavelengths producing a plurality of spots will be present. The preferred lens will also have flat field ("Plan") correction for off-axis aberrations because the camera system 186 will preferably incorporate a digital image sensor, and because it may be anticipated that the invention will be used in conjunction with planar samples such as silicon wafers.

Some portion of the light beam focused by the objective lens 170 close to the front focal plane 174 of the lens will be reflected by the target object 178 also located close to the front focal plane 174. Another portion will be absorbed. It is also possible that some portion of the light beam will be transmitted through the target object 178, depending on the material and thickness of the target object 178, and the wavelength of the light beam.

Some portion of the light beam reflected by the target object 178 will re-enter the objective lens 170 and return to a substantially collimated state. The portion of the beam that re-enters the objective lens 170 may be maximized by laterally offsetting the incoming collimated beam in order to introduce a specific angle to the focused light beam, as described in detail in U.S. Pat. No. 8,370,960, Modular Atomic Force Microscope, referred to above and incorporated herein by reference. A substantial part, but not all, of the reflected light beam that re-enters the objective lens 170 reflects off the dichroic mirror 156 and is directed to the quarter-wave plate 152 which then converts the circularly polarized returning light beam into a linearly polarized light beam. Because the polarization orientation is now orthogonal to the polarization orientation of the original light beam that previously crossed the quarter-wave plate 152 in the other direction, the light beam reflects off the polarizing beamsplitter 144 instead of traversing it. In the event that the quarter-wave plate 152 has been replaced by a waveplate having retardance and orientation to compensate for phase shifts in optical elements coming after the quarter-wave plate 152, as discussed above, the returning light beam reflects entirely off the polarizing beamsplitter 144.

The reflected beam then impinges on a photodetector 182 which, when the present invention is being used to measure the deflection or oscillation of the probe, measures the position of the light beam. The two-dimensional position of the light beam on the photodetector 182 is used as a measure of the two-dimensional angular deviation of the target object 178 that reflected the light beam. However, when the present invention is employed to focus more than one light beam onto the probe (or the sample) to enable functionalities other than measuring probe displacement, the photodetector 182 can be used to measure the light power of the light beam.

A portion of the light beam that re-enters the objective lens 170 will traverse the dichroic mirror 156 and can be imaged using the camera system 186 if the target object 178 is illuminated by an appropriate light source, preferably a white light source. The camera system 186 can also image the focused light spot reflected from the target object 178.

In order to assure that the brightness of the target object 178 is similar in magnitude to the brightness of the reflected light beam entering the camera system 186, a color filter 190 can be used to selectively dim the light beam to any degree necessary. It may also be necessary to adjust the exposure time and aperture size provided by the camera system 186 to obtain proper exposure of the target object 178 and focused light spot. Even if only a small amount of the reflected light beam traverses the dichroic mirror 156 to the camera system 186 the beam will appear very bright due to its high power density. Therefore, it is anticipated that the filter 190 will be necessary to provide a good quality image in the camera system 186.

Figure 2:
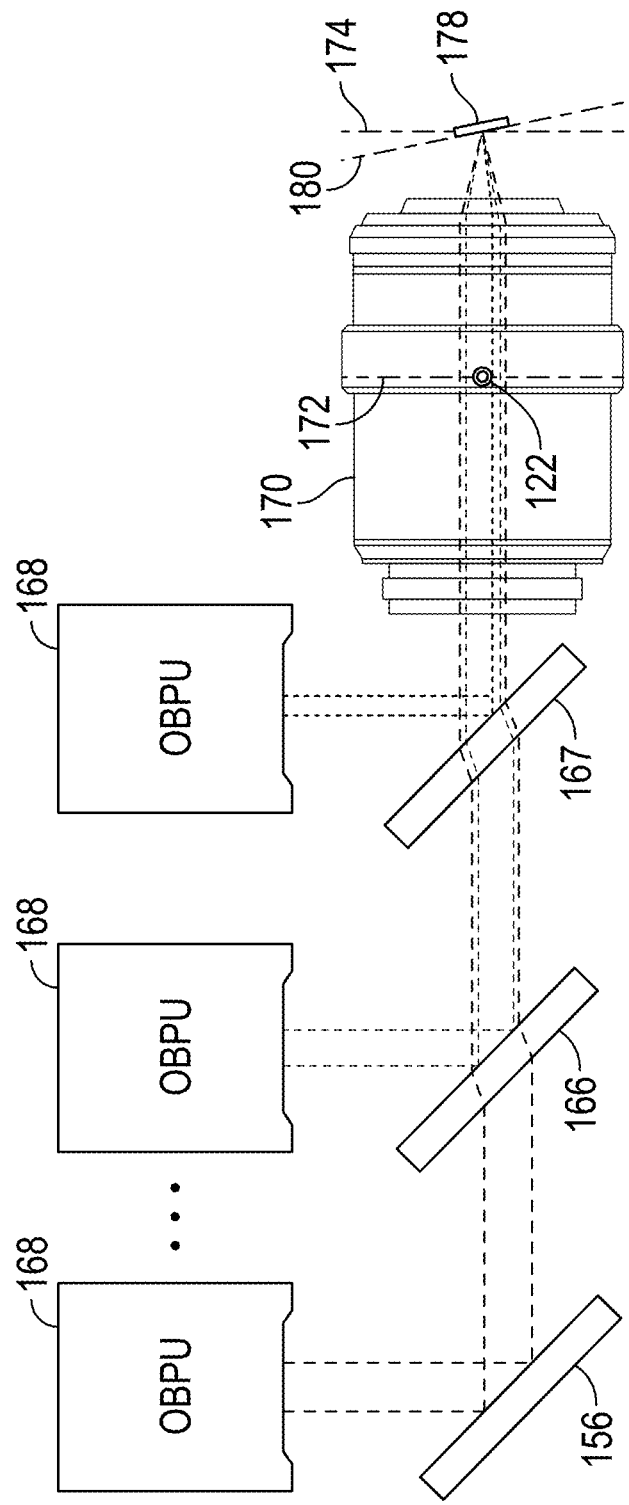
FIG. 2: Block diagram showing a light path of the present invention with a multiplicity of optical beam positioning units.
Figure 3:
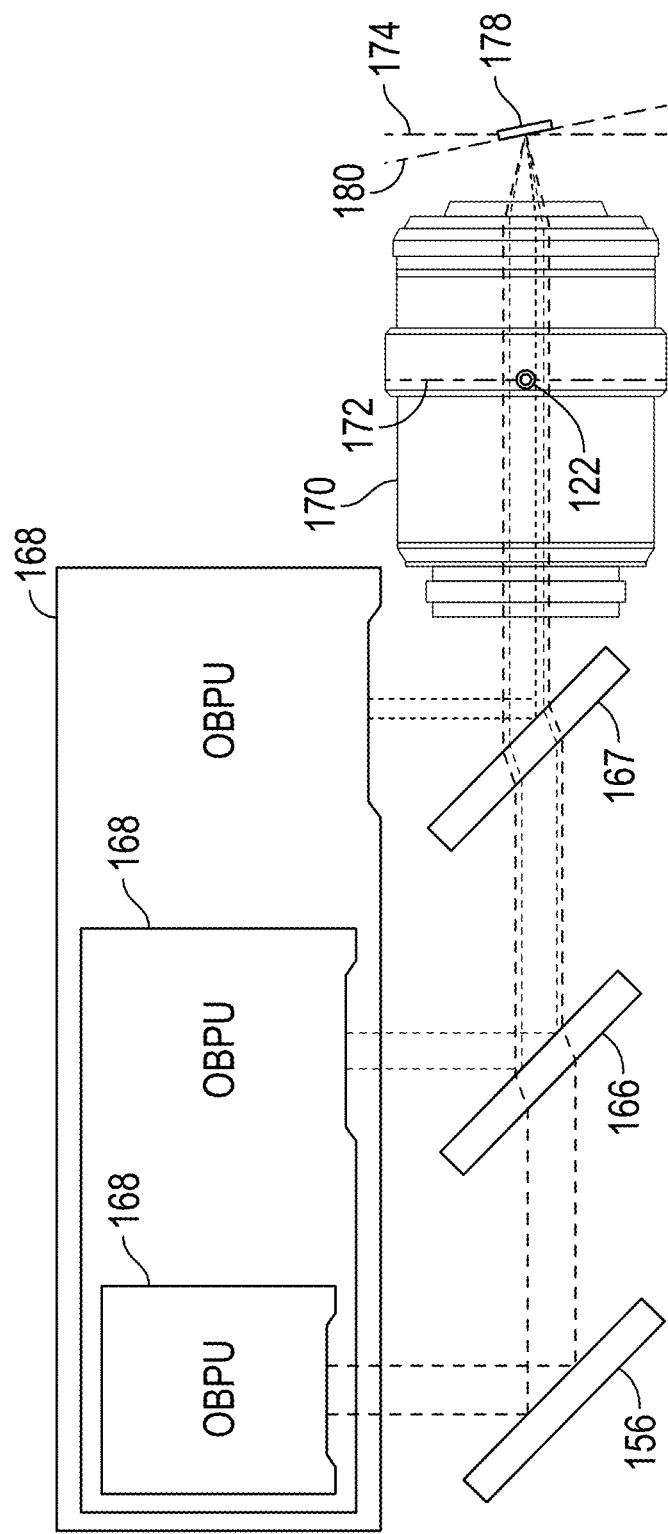
FIG. 3: Block diagram showing a light path of the present invention with a multiplicity of nested optical beam positioning units.

As described earlier, translating the goniometric lens group 136 along its axis changes the axial location of the final focused spot relative to the front focal plane 174 of the objective lens 170. Prior art would have positioned the light beam focus in the axial direction by either moving the objective lens 170, or moving the target object 178, or both. The present invention allows the light beam to be focused without moving the objective lens 170 or the target object 178. The same will be true for the light beam from another optical beam position unit (or units), with their own goniometric lens groups 136. The light beams of such other units would enter the light path via other dichroic mirrors located between the dichroic mirror 156 of the first optical beam positioning unit and the objective lens 170. FIG. 1 shows one such dichroic mirror 166. FIG. 2 shows a light path with a multiplicity of optical beam position units and dichroic mirrors. The additional dichroic mirrors, starting with dichroic mirror 166, may have different optical specifications than dichroic mirror 156 in order to optimally combine different light beams while minimizing loss of light power. When the goniometric lens group 136 of any one of such units is translated the axial location of the final focused spot of the relevant unit relative to the front focal plane 174 of the objective lens 170 is changed without either moving the objective lens 170, or moving the target object 178, or both. This is a significant difference relative to prior art because moving the objective lens 170, or moving the target object 178, or both, in order to position the light beam focus in the axial direction for the benefit of one optical beam positioning unit could significantly degrade the performance of other optical beam positioning units. FIG. 3 shows another variation of the FIG. 2 arrangement with multiplicity of optical beam position units feeding into a single light path. In FIG. 3 two or more optical beam position units have their translational degrees of freedom coupled so that their respective focused light spots move together in a desired direction. For example, a secondary optical beam position unit may be tethered to a primary optical beam position unit so that their focused light spots move together when the focused light spot of the primary optical beam position unit is translated in one or more directions, while the focused light spot of secondary optical beam position unit is also moved focused independently relative to the focused light spot of the primary optical beam position unit. Although FIG. 3 represents three nested optical beam position units, any number of degrees of freedom between any number of optical beam position units may be coupled as preferred by the user.

Metrological SPM

A metrological SPM or AFM may be created by combining an SPM or AFM which employs an optical lever arrangement to measure displacement of the probe indirectly with another SPM or AFM which measures the displacement of the probe directly through the use of an interferometric detection scheme.

The inventors have used a SPM (the Cypher SPM from Asylum Research of Santa Barbara, Calif.) and a quantitative laser doppler vibrometer (LDV) (the Laser Doppler Vibrometer from Polytec of Waldbronn, Germany) for such a metrological SPM. The instrument allows normal SPM operation with the SPM optical lever arrangement while simultaneously allowing NIST-traceable measurements of the displacement and velocity of the probe with the LDV system. The inventors are building on the present invention by combining two optical beam position units into the metrological SPM, one unit for the optical lever arrangement of the SPM and the other unit for interferometer of the LDV.

Figure 10A:
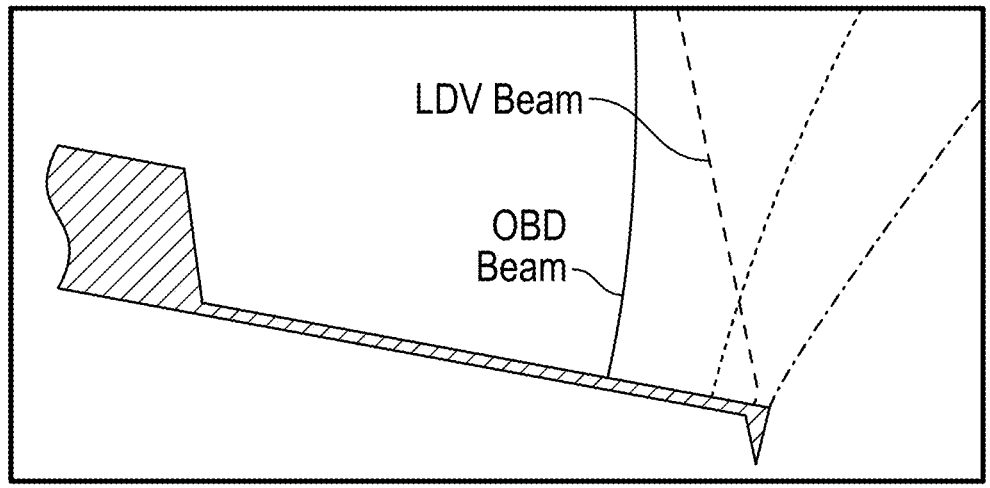
FIG. 10A is a Drawing of the ends of the optical paths of the SPM and the LDV focused congruently onto a cantilever.
Figure 10B:
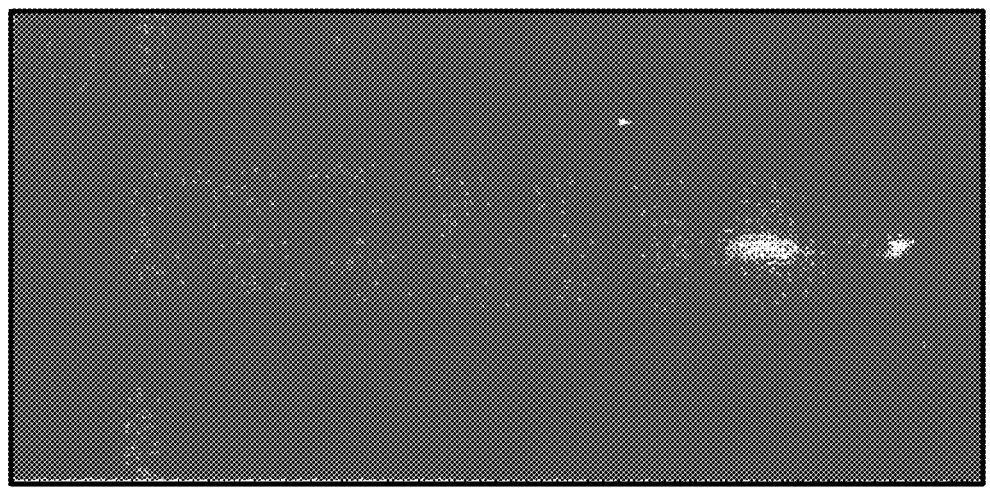
FIG. 10B is an Image of spots produced by the light beams on the side of the cantilever opposite the tip.

Panel (a) of FIG. 10 shows side views of the end of the optical path of the Cypher SPM and the end of the optical path of the LDV focused congruently onto a cantilever. Panel (b) of FIG. 10 shows the spots produced by the light beams on the side of the cantilever opposite the tip. The rectangular spot was produced by the SPM and the circular spot by the LDV. Both spots can be separately positioned and focused, or moved together relative to the cantilever frame of reference. By virtue of its large numerical aperture, the LDV spot can be focused down to ~2 microns. This allows high-resolution mapping of the cantilever dynamics. Unlike sensitivity with the optical lever method, LDV sensitivity is not affected by the reduction of spot size. More importantly, because the LDV measurement is encoded as a frequency (doppler) shift of a HeNe laser, the sensitivity is highly accurate and does not change with the optical properties of the cantilever nor with laser power.

Figure 11:
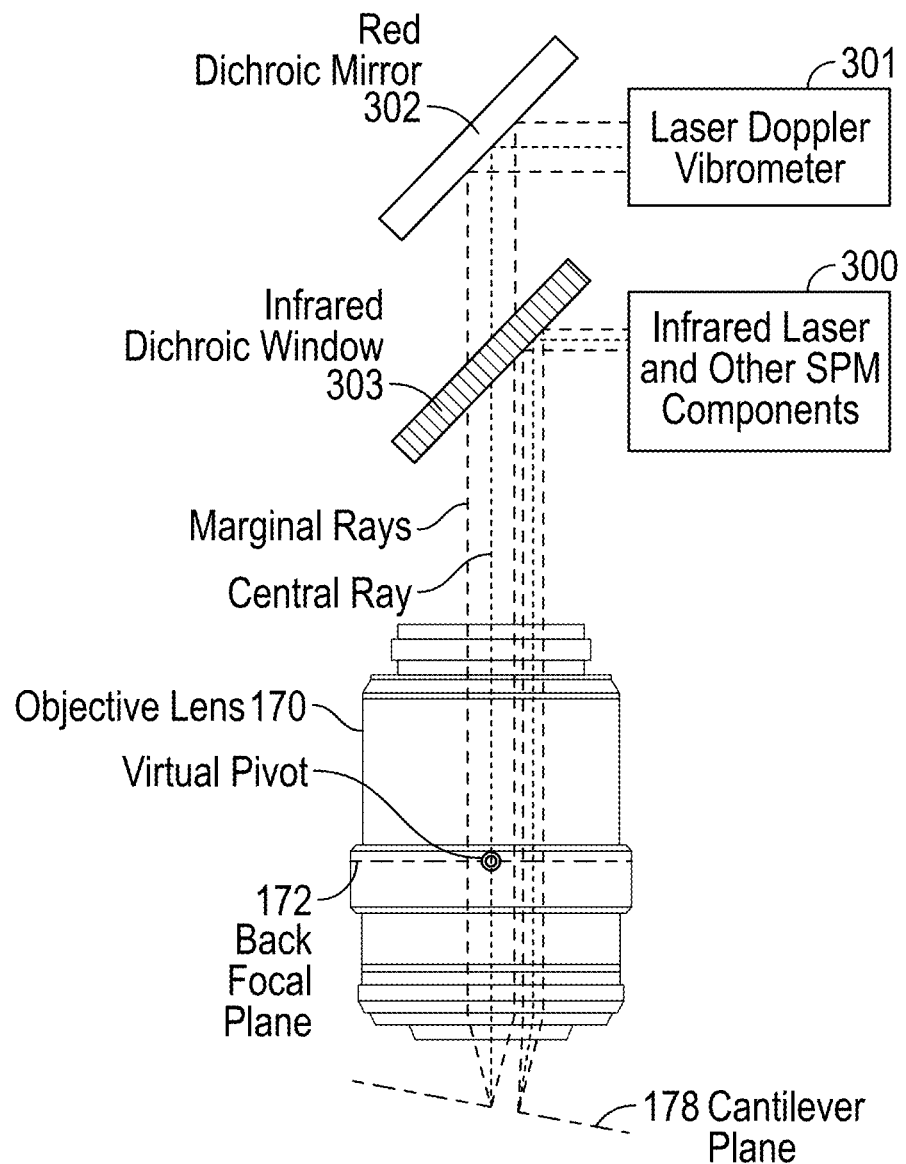
FIG. 11: Light paths of SPM and LDV with optical beam positioning unit for each path.

FIG. 11 shows the principal features of the two light paths of the two components of the Metrological SPM. The light path of the SPM of the present invention is shown in greater detail in FIG. 1 discussed above, but the features of importance for the light path of the SPM in the Metrological SPM are identified on the right of FIG. 11. The light path on the right of FIG. 11 has a light source 300 (and other components of the light path discussed below) as does the light path of FIG. 1, light source 100, but light source 300 is identified as an infrared laser while light source 100 is identified as a laser diode or other light source. The other components of the light path of FIG. 1 included in light source 300 but not specifically identified are a polarizing beamsplitter, quarter wave plate and photodetector (respectively identified as items 128, 152 and 182 in the light path of FIG. 1). The other components of the light path of FIG. 1, particularly the steering mirror 116 and associated hardware that makes use of the steering mirror, are not included in the light path on the right of FIG. 11.

The features of importance for the light path of the LDV in the Metrological SPM are identified on the left of FIG. 11. The light path of the LDV starts with the laser doppler vibrometer 301. For the purposes of the metrological SPM, a substantial portion of the laser light produced in the LDV 301 is directed to a red dichroic mirror 302. The remainder of the laser light so produced (not shown) is used for the second beam required for the device to function as an interferometer (not shown).

The light from the infrared laser 300 in the light path on the right of FIG. 11 is reflected by an infrared dichroic window 303 in the direction of the objective lens 170. This lens is substantially the same lens as the objective lens of FIG. 1.

Much of the laser light directed to the red dichroic mirror 302 in the light path on the left of FIG. 11 is reflected by the mirror and passes through the infrared dichroic window 303 in the direction of the objective lens 170.

After having passed through the objective lens 170 the light from the infrared laser 300 in the light path on the right of FIG. 11 reaches the target object 178 (which includes the cantilever plane) and is reflected by the target object 178 back through the objective lens 170 and thereafter is reflected by the infrared dichroic window 303 to the photodetector (which as already noted is included in light source 300) in order to carry out the traditional optical lever measurements of the position of the light beam on the probe and the probe's deflection or oscillation.

of the position of the light beam on the probe and the its deflection or oscillation.

After having passed through the objective lens 170 the laser light from the infrared dichroic window 303 in the light path on the left of FIG. 11 reaches the target object 178 (which includes the cantilever plane) and is reflected by the target object 178 back through the objective lens 170 and thereafter through the infrared dichroic window 303 to the red dichroic mirror 302 from which it is reflected to the LDV where it is combined with the second beam (not shown) generated by the LDV in order to measure interferometrically the objects of interest.

Figure 12:
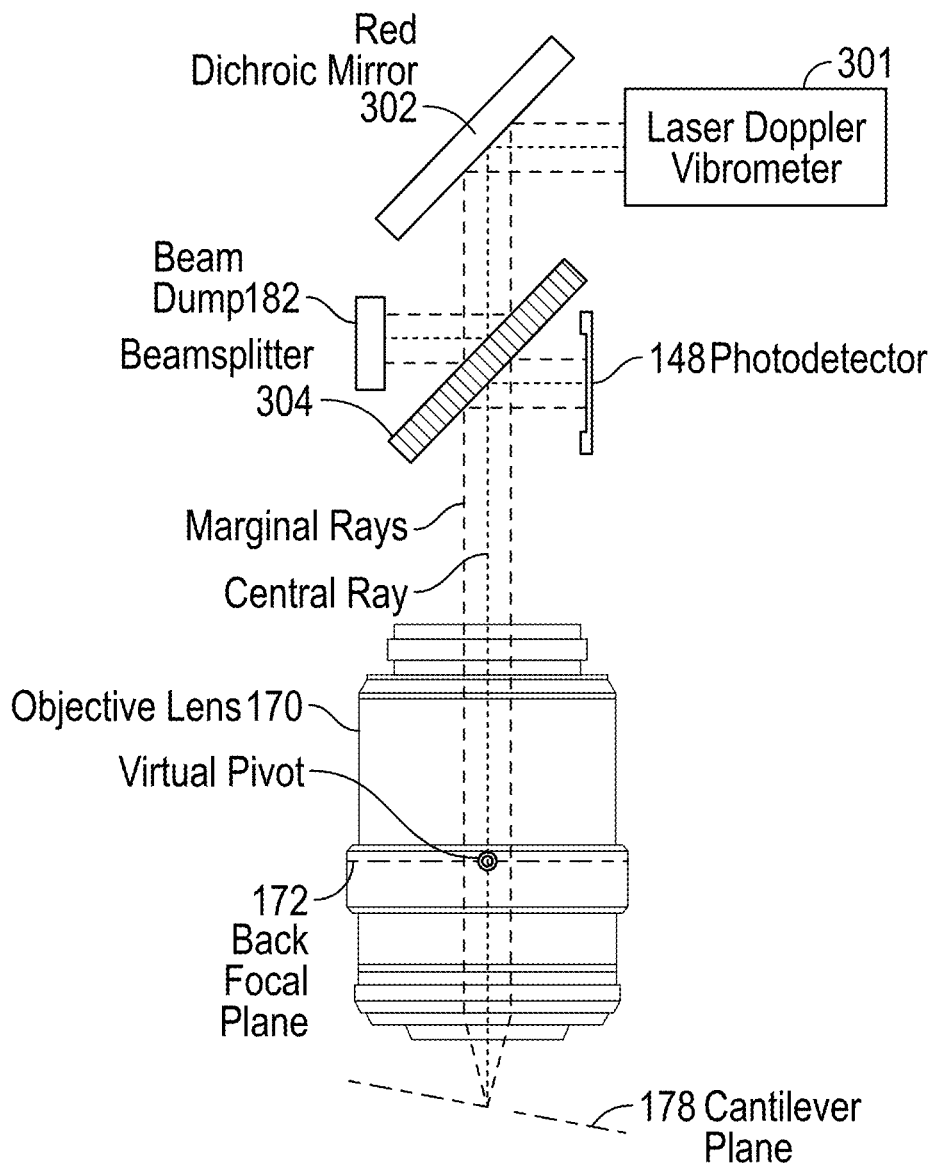
FIG. 12: Light Path of SPM and LDV with single optical beam positioning unit.

A second approach to a Metrological SPM is shown in FIG. 12. Here the inventors use only the quantitative laser doppler vibrometer (LDV) used in the previous Metrological SPM. This approach also allows normal SPM operation, equivalent to that with the Cypher SPM optical lever arrangement, while simultaneously allowing accurate NIST-traceable measurements of displacement and velocity of the probe. As with the first Metrological SPM the inventors are taking advantage of the present invention and using the optical beam position unit technology, but here only one such unit is required even though the functionality of both an optical lever arrangement and an interferometer are provided.

The features of importance for this second approach are shown in the light path of the Metrological SPM in FIG. 12. The light path starts with the laser doppler vibrometer 301. As with the first approach to a Metrological SPM, a substantial portion of the laser light from the LDV 301 is directed to a red dichroic mirror 302. The remainder of the laser light so produced (not shown) is used for the second beam required for the device to function as an interferometer (not shown).

Much of the laser light directed to the red dichroic mirror 302 is reflected by the mirror and about half of this light passes through the beamsplitter 304 in the direction of the objective lens 170. The other half is absorbed by the beam dump 182.

After having passed through the objective lens 170 the laser light from the beamsplitter 304 reaches the target object 178 (which includes the cantilever plane) and is reflected by the target object 178 back through the objective lens 170 and thereafter about half of the laser light exiting the objective lens 170 passes through the beamsplitter 304 and reaches the red dichroic mirror 302 from which it is reflected to the LDV where it is combined with the second beam (not shown) generated by the LDV in order to measure interferometrically the objects of interest.

The other half of the laser light exiting the objective lens 170 is directed by the beamsplitter 304 to the photodetector 148 in order to carry out the traditional optical lever measurements of the position of the light beam on the probe and the probe's deflection or oscillation.

Piezoresponse Force Micoscopy (PFM) and Metrological SPM

PFM is based on the converse piezoelectric effect. After putting the cantilever tip in contact with a piezoelectric sample, the tip-sample bias voltage is modulated periodically. This generates an oscillating electric field below the tip and leads to localized deformations in the sample surface. The resulting sample vibrations act as a mechanical drive for the cantilever tip. The magnitude of effective piezoelectric response of the surface $d_{eff}$, in pm/V, is measured as the amplitude of the tip displacement divided by the amplitude of the tip-sample voltage. In addition, the phase of the response provides information about the polarization direction.

It is well known that the drive frequency of the electrical excitation can have a profound effect on the measured signal. Since the frequency response of most ferroelectric samples should be flat into the GHz range, this suggests that some features in the frequency response into the MHz range may originate from cantilever dynamics instead of ferroelectric effects. In order to minimize the effects of cantilever resonances on the ferroelectric signal, single-frequency PFM has mostly been limited to operation at a few hundred kHz or lower, with some exceptions. Two- or multiple-frequency techniques such as dual AC resonance tracking (DART) and band excitation (BE) have reduced the severity of the problem by tracking the resonance frequency, but to a limited degree.

In addition, there are other forces present that respond to tip-sample bias modulation at any drive frequency, such as delocalized electrostatic forces between the body of the cantilever and the sample surface charge. In many cases, the undesirable response of the cantilever to these electrostatic forces overwhelms the PFM signal of interest. Over the years, a number of approaches for maximizing the PFM response and minimizing or eliminating the electrostatic components have been developed; however, this issue remains a significant challenge. Misinterpreting the electrostatic signal as a tip displacement can lead to incorrect estimation of the piezoelectric sensitivity and relative phase response.

Figure 13A:
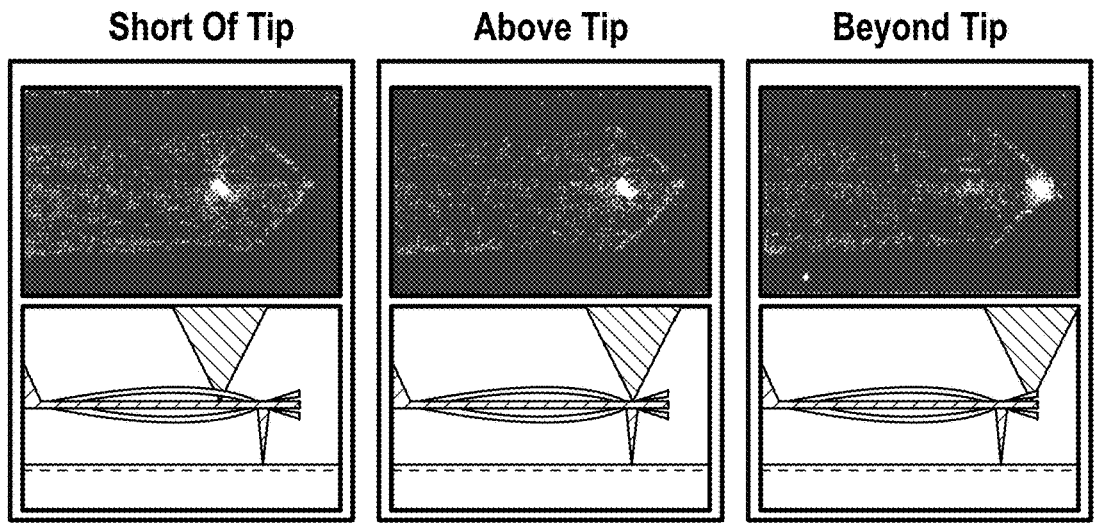
FIGS. 13A, 13B and 13C: Effect of laser spot location on cantilever response.
Figure 13B:
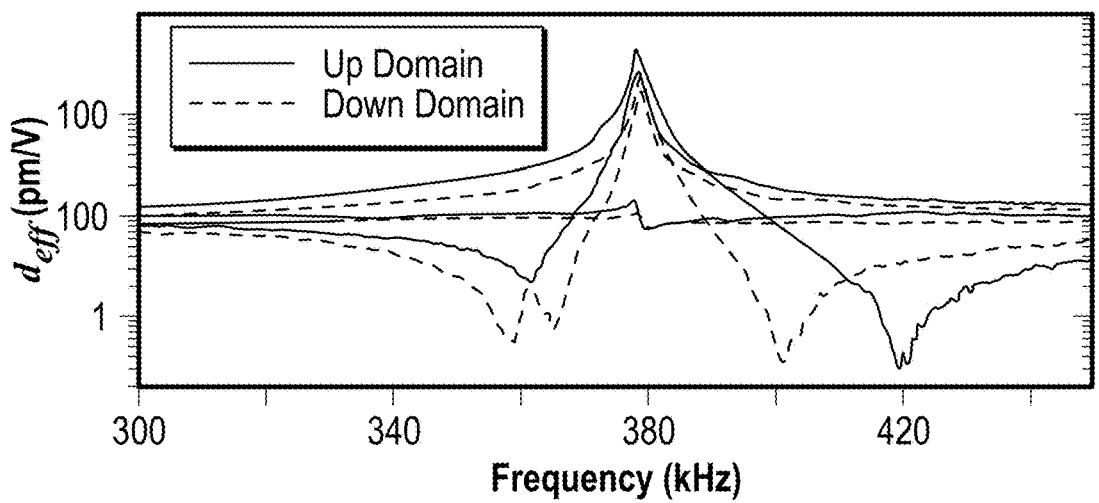

Positioning the LDV spot in different locations on the cantilever relative to the tip location allows direct investigation of the cantilever dynamics that occur in PFM experiments. FIG. 13(a) illustrates three distinct scenarios: the laser spot is located on either side of the tip, or directly above the tip. FIG. 13(b) shows the evolution of the system transfer function as the LDV spot is moved along the length of cantilever. As the laser spot is moved towards the end of the cantilever, an anti-resonance sweeps upward in frequency around the contact resonance peak. When the LDV spot is located immediately above the tip (black curve), the resonance and anti-resonance pair cancels out and leads to a nearly flat response. In this specific location, the LDV signal is blind to the dynamics of the cantilever and reports only the displacement of the tip, as can be understood by inspection of FIG. 13(a). This situation is ideal for quantifying surface strain.

Figure 13C:
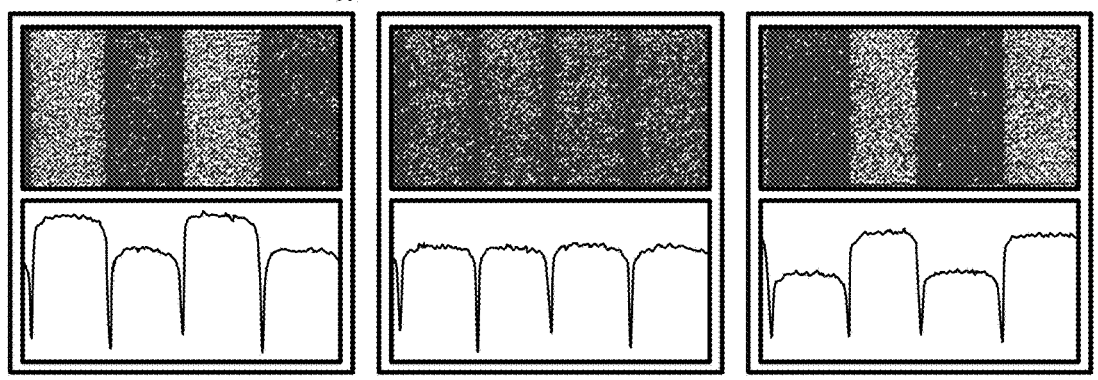

FIG. 13(c) demonstrates how the LDV spot location affects the measured response. Although the images were acquired at a drive frequency of 25 kHz, well below the contact resonance frequency of 380 kHz, the cantilever dynamics still have significant impact on the measured values of $d_{\mathit{eff}}$ between different domains. In this scenario, the LDV measurement couples both the tip displacement and the cantilever dynamics. As explained in the previous paragraph, it is only when the laser spot is directly above the tip that the measurement is decoupled from the cantilever dynamics.

These results suggest a methodology for accurately quantifying the electromechanical response of a sample. Once tip-sample contact is established with a chosen OBD deflection setpoint, the contact resonance frequency is identified by electrically driving the cantilever. Then, the LDV spot position is optimized by iterative minimization of the measured frequency response around the resonance frequency. Finally, after achieving a flat frequency response around the contact resonance, conventional sub-resonant electromechanical imaging can be performed with much higher accuracy. This protocol greatly extends the available frequency range for accurate PFM measurements, which is now limited only by the precision in positioning the LDV laser spot directly above the cantilever tip.

Photothermal Excitation

In addition to being used to measure the deflection or oscillation of the probe, the light beam of an optical beam positioning unit can be used to photothermally excite mechanical vibrations of the probe. For this purpose light at the blue end of the visible spectrum is preferred. The inventors have used the beam from a laser emitting light with a wave length of 405 nm with satisfactory results.

In the prior art, a coating on some or all of the cantilever portion of the probe was required to convert heat from the light beam into mechanical strain in the probe, via different thermal expansion coefficients of the coated portion of the cantilever and the remainder of the probe. While the current invention is compatible with such coated cantilevers, it does not require a coating to photothermally induce mechanical vibrations of the probe. Due to the well-corrected optical design, the light beam focus in the present invention is significantly smaller than in the prior art. The smaller light beam focus produces larger thermal gradients that cause photothermal excitation even in probes fabricated from a single material. Because the material of the probe has nonzero thermal expansion, the thermal gradients produce strain gradients, especially when the light beam power is modulated to produce time-varying temperature gradients. For example, the light beam power can be changed sinusoidally as a function of time, producing a sinusoidal mechanical motion as required for amplitude-modulated atomic force microscopy. As described in prior art, such mechanical motion or vibration may also be enhanced by differences in thermal coefficients of expansion of two or more materials composing the probe in the case of heterogeneous probes.

Photothermal excitation of the probe may also be used in conjunction with other methods to form hybrid modes of cantilever excitation. For example, the cantilever may be driven by piezoacoustic excitation at a first resonance while simultaneously driven by photothermal excitation at a second resonance. This combination is useful if a large amplitude of oscillation, achievable with piezoacoustic excitation, is necessary for a first resonance, while the clean response of photothermal excitation is preferable for driving a second resonance. Alternative schemes for excitation may be developed to meet specific experimental goals. For example, photothermal excitation could be used to excite mechanical motion at a resonance of the cantilever while piezoacoustic excitation is used to drive the cantilever at a frequency that is not close to a cantilever resonance. Some of these schemes of excitation may involve frequency modulation or frequency tracking, in order to measure mechanical parameters of the sample, the probe or the tip of the probe. In this case, photothermal excitation is known in the prior art to provide an advantage because it provides a transfer function from excitation voltage to mechanical motion that is substantially independent of frequency and free from spurious resonances.

The location of the focused light beam on the probe used for photothermal excitation affects the drive amplitude of the probe. The relationship between location and drive amplitude is also frequency dependent because the probe has a frequency response composed of many normal and torsional eigenmodes. There are locations that provide zero excitation of the second eigenmode, while providing non-zero excitation of the first eigenmode, for example. Depending on the experiment, it may be desirable to tune the drive amplitude of the probe at different frequencies. This may be achieved by modulating the power of the photothermal excitation light beam at particular frequencies, that may correspond to different eigenmodes of the probe, while rastering the focused spot relative to the probe and measuring the driven amplitude. It may be desirable, for example, to maximize the torsional (or normal) vibration response of the probe, while minimizing the response of the normal (or torsional) deflection of the probe in certain experiments.

Figure 9:
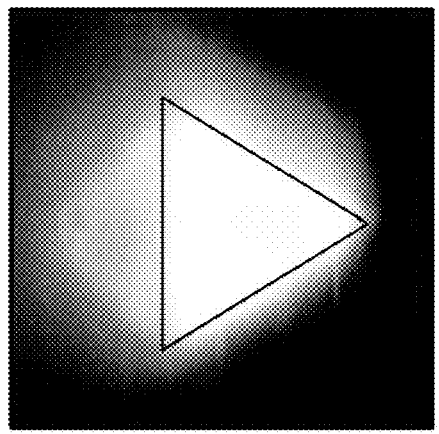
FIG. 9: Photographs showing cantilever response to being driven at different frequencies and locations.
Figure 9:
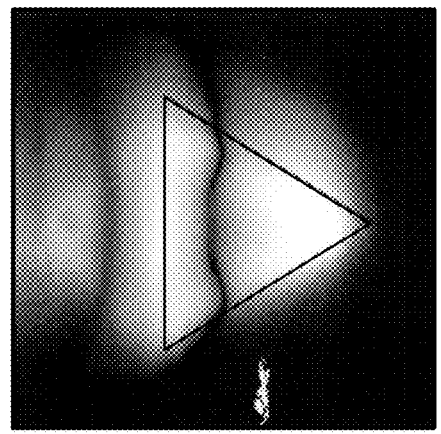
Figure 9:
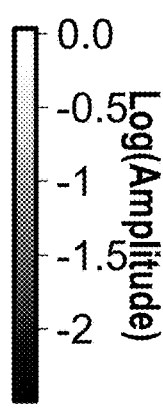

FIG. 9 shows an amplitude map of an ArrrowUHFAuD cantilever as a function of blue laser excitation near the probe. The amplitude response is also function of the modulation frequency of the blue light power. Modulating the light power at frequencies near the $1^{st}$ eigenmode and $2^{nd}$ eigenmode of the probe, as shown in both images, induces different bending modes of the cantilever which have different location-dependent responses. The width and height of each map is 66 microns. The outline of the cantilever is also drawn for reference.

blueTherm

The light beam of an optical beam positioning unit can also be used to heat certain parts of the target object 178 to a varying degree. For this purpose light at the blue end of the visible spectrum is preferred. The inventors have used the beam from a laser emitting light with a wave length of 405 nm with satisfactory results.

Heating certain parts of the target object 178 to a varying degree causes a desirable steady-state temperature gradient to form in the probe or the sample at time scales that are longer than the mechanical time constant of the object being heated. Such a steady-state temperature gradient may occur while vibrations of the target object 178 are being induced by modulating the light beam at faster time scales. In any case, with the probe the temperature gradient can be optimized by adjusting the total optical power of the light beam and the beam position relative to the probe to control the temperature of a certain part of the probe, such as the tip of the cantilever. The variable temperature of the probe and the tip of the cantilever can be used to induce thermally activated changes in the sample according to any desired experimental protocol. One category of such experiments is known as local thermal analysis. In the prior art it is carried out using a special probe with heating elements and even a thermometer microfabricated in the probe. Such special probes are costly and are only available in a few spring constant values. With the present invention however such special probes are unnecessary as the focused light beam of the optical beam positioning unit can heat any existing probe useful for a local thermal analysis experiment.

Although the present invention can photothermally excite mechanical motion in uncoated probes, it may still be beneficial to optimize the optical and thermal properties of the probe for heating with the light beam of an optical beam positioning unit. For example, the reflectivity of the coating of the probe may be tuned appropriately, and the thermal conductivity of the probe may be patterned, through selective doping, in order to allow heat to flow to the tip of the cantilever more readily than to flow to the base of the probe (or vice versa). Furthermore, the probe may be shaped in order to facilitate conduction of heat to the tip of the cantilever; for example, the tip of the cantilever may be hollow such that the incident beam is absorbed closer to the tip. Patterning a metallic coating on the probe or the tip of the cantilever may also be used to maximize the heat flow to the tip to attain higher tip temperatures for a given light power. Coating only the end of the probe near the tip, while keeping the bulk of the probe uncoated, may also be beneficial by reducing unwanted bending of the probe caused by thermal expansion coefficient differences between the coating material and the probe material.

It is beneficial to measure the temperature of the probe for several types of experiments, such as calibrating the spring constant based on thermomechanical motion. In the present invention, the temperature of the probe may be quantified by measuring the change in the resonant frequency of the probe while changing the power of the light beam, by turning the light beam on and off for example. The temperature of the probe is related to its resonant frequency because Young's modulus of the probe is dependent on the temperature of the probe. Furthermore, the residual stress in coated probe may have a temperature dependence that can impact the relationship between the resonant frequency and the temperature. The temperature may also be inferred by measuring the deflection of the cantilever before and after turning the light beam on (or off).

Frequency-modulated AFM (FM-AFM) imaging has garnered a great deal of attention because of its high spatial resolution in air, vacuum and even fluid. Even with the prior art, FM-AFM has demonstrated success at imaging single atomic defects, imaging individual chemical bonds between surface atoms and measuring the force as a single atom was moved across a surface.

FM-AFM also permits simultaneous measurement of dissipative interactions between the tip of the cantilever and the sample. Dissipation is a combined effect of multiple interactions including long range electrostatic and magnetic interactions, as well as hysteretic interatomic forces associated with the approach and retraction of the tip of the cantilever from the surface. In the prior art the measurement of dissipation has been unreliable. Dissipation is difficult to quantify and relate to underlying physical mechanisms and results have not been reproducible. One important feature required for accurate dissipation measurements is frequency independent probe excitation. Specifically, coupling between the drive amplitude and frequency can lead to spurious dissipation measurements. Piezoacoustic excitation, especially in liquid, suffers from a "forest of peaks" in the transfer function between the excitation voltage and the mechanical motion. These peaks are caused by spurious resonances in the mechanical system, such as the resonances of a cantilever holder or liquid droplet. The peaks are not reproducible from one experiment to the next, and can even drift during one experiment. Because of these peaks, piezoacoustic excitation is very frequency-dependent, sometimes changing by a factor of ten within the probe bandwidth. Since the photothermal drive described here is substantially constant or at the least varies only slowly over typical operational frequencies, it provides more accurate dissipation measurements than the piezoacoustic excitation commonly used in the prior art and is much more reproducible.

blueClean

After what is usually substantial use, AFM probes become contaminated by interaction with the sample. Contaminated probes must either be replaced by new probes or where feasible cleaned. In typical laboratory settings, probes are often cleaned ex situ using an assortment of chemical solutions, sometimes combined with UV exposure. In prior art, a dedicated apparatus was often used for cleaning probes. The cleaning of probes frequently involves a significant amount of time, and often is not successful. However replacing a contaminated probe with a new one can cost a significant amount of money. In either case, the experiment must be halted to remove and replace the existing probe from the AFM. Removing and replacing the probe also loses information regarding the sample location being imaged.

Heating the probe may be used as a method of cleaning the tip of the cantilever. For this purpose light at the blue end of the visible spectrum is preferred. The inventors have used the beam from a laser emitting light with a wave length of 405 nm with satisfactory results.

Before, during, or after imaging a sample, the light beam of an optical beam positioning unit may be turned on momentarily to heat the tip of the cantilever in order to modify the tip coating or to break down, thermally modify or remove contaminations that have adhered to the tip. This method of cleaning or modifying the tip of the cantilever has the advantage over prior art that the process can be performed in situ, while the probe is in close proximity to the sample. The fact that the tip of the cantilever can be cleaned or modified without removing it from the AFM is a time-saving and important improvement in that it allows the continuation of the experiment after cleaning or modification without any cumbersome repositioning of the probe.

A well-parameterized probe is very important in nanomechanical measurements, such as stiffness, storage and loss moduli, loss tangents, adhesion, indentation and a host of other parameters known to one skilled in the art. For this application a clean probe is of great importance.

Sample Modification

The light beam of an optical beam positioning unit may be used for inducing photochemical, photovoltaic, photothermal, pyroelectric or other light sensitive changes to specific portions of the sample. For photothermal changes light at the blue end of the visible spectrum is preferred. The inventors have used the beam from a laser emitting light with a wave length of 405 nm with satisfactory results. For photochemical, photovoltaic and pyroelectric changes light with a variety of wave lengths is satisfactory.

Changes of this character may be accomplished either with the beam positioned on the probe or with the beam off the probe. The positioning of the light beam allows the user to select the locations of the sample that may undergo such changes, while the total power of the light beam can be tuned to vary the degree of changes induced in the chosen sample location. Moving the position of the focused light beam in two or three dimensions while varying the light power of the light beam enables the preparation or modification of the AFM sample before, during, or after imaging.
blueTracking As discussed above, in an AFM changes in the oscillation amplitude of the probe are typically made to trigger a change in the vertical position of the base of the probe relative to the sample (referred to herein as a change in the Z position, where Z is generally orthogonal to the X/Y plane defined by the sample), in order to maintain the oscillation amplitude at a constant pre-set value. It is this feedback that is typically used to generate an AFM image as the probe is rastered above the sample surface.

In some instances however mechanical resonances of the AFM hardware limit the response time of tracking the Z position of the sample topography. Attempting to track the surface of the sample with a frequency bandwidth that exceeds these mechanical resonances leads to oscillations that prevent accurate topography tracking and damage the tip of the cantilever.

This issue can be avoided by using the light beam to induce deliberate sub-resonance bending of the cantilever. Bending a cantilever upwards or downwards is analogous to moving the sample downwards or upwards. Because the mechanical resonance of a small cantilever greatly exceeds the mechanical resonance of the AFM mechanical hardware, the feedback for keeping constant oscillation amplitude for accurate topography tracking can be operated at very high frequencies—upwards of 100 kHz.

For this purpose light at the blue end of the visible spectrum is preferred. The inventors have used the beam from a laser emitting light with a wave length of 405 nm on a gold coated cantilever with satisfactory results. Other wavelengths may be preferable if the cantilever is uncoated or coated with a material other than gold.

By varying the light power at time scales slower than the oscillation period of the cantilever, the cantilever bending can be approximated as linear with the light power. The light power is thus used to change the distance between the tip of the cantilever and the sample in order to track topography changes while rastering the tip over the sample surface. This device for tracking topography changes can be used in conjunction with the optical lever of an AFM, or can entirely replace the optical lever. In other words, as the sample is moved in the x and y direction for scanning, the cantilever bending resulting from the use of light power changes can be used to maintain the conditions for topography tracking. For example, in the case of amplitude modulated AFM, the on-resonance amplitude of oscillation can be held constant by the aid of a feedback loop that changes the cantilever bending through the use of light power changes. This method has the additional advantage that the same light beam can be used to oscillate the cantilever on resonance while the average light power is independently modulated to track the sample topography.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. An atomic force microscope system that operates to characterize a piezoelectric sample, comprising:
   an atomic force microscope probe having a cantilever with a cantilever tip;
   the cantilever tip in contact with the piezoelectric sample,
   a bias voltage source, producing a bias voltage between the cantilever tip and the piezoelectric sample, the bias voltage source modulating the bias voltage periodically to generate an oscillating electric field below the cantilever tip, which leads to localized deformations in a surface of the sample, which deformations act as a mechanical drive for the cantilever tip;
   a controller which determines a contact resonance frequency of the cantilever tip on the sample; and
   a tip amplitude detector which measures a magnitude of effective piezoelectric response of the surface, as an amplitude of a tip displacement divided by an amplitude of the bias voltage between the tip and sample, where the tip amplitude detector measures the response at a spot on the cantilever,
   and where a location of the spot on the cantilever is adjustable,
   and where the tip amplitude detector optimizes the spot by adjusting the location using iterative minimization of the measured frequency response around the resonance frequency.

2. The system as in claim 1, wherein the controller operates at only a single frequency of oscillating electric field.

3. The system as in claim 1, wherein a phase of the effective piezoelectric response of the surface provides information about a polarization direction.

4. The system as in claim 1, wherein the spot is a laser spot.

5. The system as in claim 4, wherein the spot is a laser spot from a laser Doppler vibratometer.

6. The system as in claim 4, where the tip amplitude detector optimizes the spot by adjusting the location using iterative minimization until achieving a flat frequency response around the contact resonance.

7. The system as in claim 4, wherein the oscillating electric field is in the Mhz range.

8. An atomic force microscope system that operates to characterize a piezoelectric sample, comprising:
an atomic force microscope probe having a cantilever with a cantilever tip;
the cantilever tip in contact with the piezoelectric sample,
a bias voltage source, producing a bias voltage between the cantilever tip and the piezoelectric sample, the bias voltage source modulating the bias voltage periodically to generate an oscillating electric field below the cantilever tip, which leads to localized deformations in a surface of the sample, which deformations act as a mechanical drive for the cantilever tip;
a controller which determines a contact resonance frequency of the cantilever tip on the sample; and
a tip amplitude detector which measures a magnitude of effective piezoelectric response of the surface, as an amplitude of a tip displacement divided by an amplitude of the bias voltage between the tip and sample, where the tip amplitude detector measures the response at a spot on the cantilever,
and where a location of the spot on the cantilever is adjustable,
and where the tip amplitude detector optimizes the spot by adjusting the location using iterative minimization of the measured frequency response around the resonance frequency to place the spot on the cantilever directly over the cantilever tip.

9. The system as in claim 8, wherein the controller operates at only a single frequency of oscillating electric field.

10. The system as in claim 8, wherein a phase of the effective piezoelectric response of the surface provides information about a polarization direction.

11. The system as in claim 8, wherein the spot is a laser spot.

12. The system as in claim 8, wherein the spot is a laser spot from a laser Doppler vibratometer.

13. The system as in claim 8, where the tip amplitude detector optimizes the spot by adjusting the location using iterative minimization until achieving a flat frequency response around the contact resonance.

14. The system as in claim 8, wherein the oscillating electric field is in the Mhz range.

* * * * *